United States Patent

[11] 3,543,975

[72] Inventor Kurt Bauer
    Ellmendingen, Germany
[21] Appl. No. 737,517
[22] Filed June 17, 1968
[45] Patented Dec. 1, 1970
[73] Assignee Firma Gustav Bauer
    Ellmendingen, Germany
    a corporation of Germany
[32] Priority June 19, 1967
[33] Germany
[31] No. 1,557,589

[54] MULTI-LAYER THERMOPLASTIC WATCHBAND
    6 Claims, 3 Drawing Figs.
[52] U.S. Cl. .................................................. 224/4
[51] Int. Cl. .................................................. A44b 5/16
[50] Field of Search ....................................... 224/4.2-
                                                      —4.6

[56] References Cited
    UNITED STATES PATENTS
    1,799,868  4/1931  Sauer, Jr. .................. 224/4.4X
    3,362,595  1/1968  Herzog ..................... 224/4(.4)UX
    FOREIGN PATENTS
    284,543  12/1952  Switzerland
    1,923,710  9/1965  Germany Primary Examiner—Gerald M. Forlenza
Assistant Examiner—Frank E. Werner
Attorney—Stephen H. Frishauf ABSTRACT: A top layer for a watchband is folded over on itself to make a loop for insertion of a cross pin of a wristwatch or buckle; after folding, the top layer ends abruptly, and a bottom layer, of suede-type plastic, is abutted against the abrupt end of the top layer; in the region of the butt end, a thermoplastic cross fusion seam is placed; additionally, all layers are fused at their longitudinal edges, except in the region of the loop to form one whole. For strength, an insert can be placed between the top and bottom layer, also folded upon itself.

Patented Dec. 1, 1970 3,543,975

Inventor
KURT BAUER

MULTI-LAYER THERMOPLASTIC WATCHBAND

The present invention relates to a multilayer thermoplastic watchstrap, in which the various layers of the strap are fused together at their edges. In the region of the watch, and for attachment of a buckle, the strap is folded over itself to form a loop, so that the cross pin of the buckle, or the watch can be passed therethrough.

Watchstraps of thermoplastic materials usually are formed by folding the top layer back over itself, to form a U-type loop and then adhering the layers together. Such a construction has the disadvantage that the top side of the band, which is usually provided with a surface having a distinctive appearance, would also be at the bottom side, which may, however, not have a pleasant feel to the touch. It is therefore desirable to provide the inner surface of the watchstrap, that is the surface in contact with the skin, with a material which is soft, such as one which has a suede-type finish. Such a strap can be made by forming the band with a third layer, for example having a roughened surface, and consisting of polyvinyl chloride, which has the characteristics suitable for a wearer. This, however, results in a strap which is comparatively thick. Watch straps, made of thermoplastic material, are usually adhered together at their edges. Customarily, the arrangement is such that the layer forming the top is folded over itself, to make the end loop, and then terminates close to the loop. This causes a gap in the continuity of the thickness of the material, which is undesirable, and which is also present when a third, suede-type layer covers the end of the loop. In order to increase the elasticity of the strap, it is customary to fuse together the various layers only at their edges. Leaving a free end of one of the other layers is undesirable because moisture may penetrate into the interior of the strap.

It is an object of the present invention to provide a watchstrap in which the disadvantages of the prior art are avoided, and which is smooth throughout and does not have any openings through which moisture may penetrate.

SUBJECT MATTER OF THE PRESENT INVENTION

The watchstrap in accordance with the present invention is so made that the top layer is folded over itself, and terminates in a blunt end beneath the end, and beyond the loop. The bottom layer is then abutted against the blunt end, and connected thereto by a cross fusion seam. This cross fusion seam, preferably, is so made that it is not visible from the top side of the band, so that the appearance of the band is not marred in any way. The thickness of the band thus remains substantially constant throughout its entire length, presents the appearance given by the top surface of the top layer, yet enables the use of a bottom layer of suede-type finish in contact with the skin. If desired, an intermediate or inner layer may be used to increase the strength of the strap.

The structure, organization, and operation of the invention will now be described more specifically with reference to the accompanying drawings, wherein.

Figure 1:
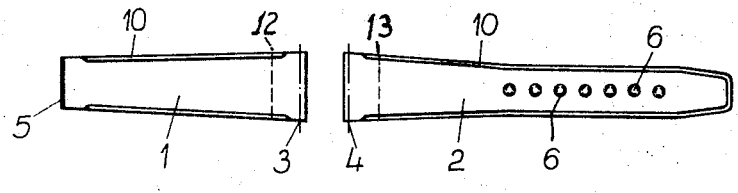
FIG. 1 is a top view of the watchband in accordance with the present invention.

The watchstrap consists of two parts 1, 2, formed with loops 3, 4, to have the cross pin of a watch passed therethrough. Part 1 has a second loop 5, for the cross pin of a buckle, the bail of which may penetrate through hole 6 in part 2.

Figure 2:
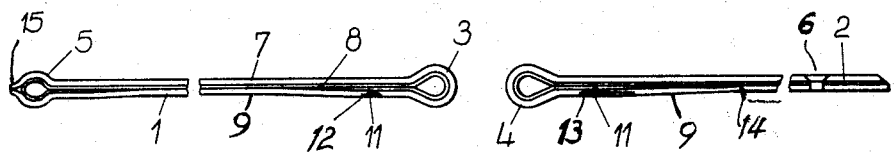
FIG. 2 is a vertical cross-sectional view.

The portions 1 and 2 consist of multilayer thermoplastic material. A top layer 7, having a top surface designed for appearance, is followed by an intermediate reinforcing layer 8. A bottom layer 9, of a material which is soft to the touch, completes the strap. The top layer 7 may be embossed or have other decoration placed thereon. Intermediate layer 8 frequently is formed with a textile reinforcement web. The bottom layer 9 preferably consists of suede-type polyvinyl chloride. The various layers 7, 8, 9, are fused together along their lateral edges 10. Top material 7, and intermediate material 8 are looped back against themselves in the region of the loops 3, 4, 5, as best seen in FIG. 2. The U-shaped loops are closed upon themselves; the lower, folded-over portion of intermediate material 8 preferably tapers to a fine line and terminates somewhat in the middle of the band. Top layer 7, after having been folded over, terminates beyond loops 3, 4, with a blunt, transverse edge 11.

Figure 3:
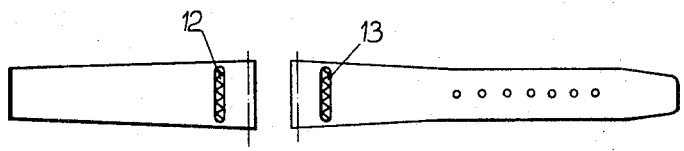
FIG. 3 is a bottom view.

Edge 11 abuts the lower layer 9 and is connected thereto by a cross seam, formed by thermal fusion 12, 13. The cross fusion seam 12, 13, only interconnects the two layers 7 and 9 along the edge 11. It does not penetrate the other layers of material, and is invisible from the top side of the watchstrap, thus does not mar its appearance. In order to stabilize the connection, the cross seams 12, 13, may extend for a short distance over the material 7, 9, and may be formed with an embossed pattern, as indicated schematically by the crosshatching in the drawings FIG. 3. The embossing preferably extends at least to some extent transverse to the major direction of the fusion seam 12, 13.

The two layers 7, 9, are interconnected at edge 11 without a step, and smoothly, so that the watchstrap, both from above as well as from below will be smooth. Additionally, the interior of the strap is completely sealed from the outside, so that no moisture may penetrate. The stability of loops 3, 4, remains excellent because the folded-over end of layer 7 is completely locked with the folded-over ends of any intermediate layer 8, if provided. Pinholes 6, of course, are also formed by thermoplastic fusion and do not permit penetration of moisture into the interior of the strap, as is well known in the art.

The arrangement may also be made such that the layer of material 8 does not terminate in the middle of the band, as at 14, but extends over the entire length of the band. This results in a band which is of equal thickness throughout its entire extent, although slightly thicker at the terminal end.

The loop for the pin of the buckle can be formed in the same way as loops 3, or 4; as an alternative, loop 5 may be made by fusing the top layer 7 and bottom layer 9 into a cross seam 15. Such an arrangement, as best seen in FIG. 2, may be used with some pin-type buckles in which the loop should prevent excessive travel of the pin, that is for buckles in which the pins are only slightly longer than the buckles themselves.

I claim:

1. In a multilayer thermoplastic watchband having:
    an elongate top layer 7 of thermoplastic material, one end thereof being folded over itself to form a loop 3, 4, 5 for insertion of a cross pin of a watch, buckle, or the like;
    an elongated bottom layer 9 of thermoplastic material; and
    longitudinal lateral edge seams 10 fusing together the lateral edges of said layers;
    the improvement wherein:
    the folded-over end of said top layer terminates beyond said loop in a blunt edge 11, said bottom layer terminating in a similar blunt edge abutting said blunt edge of the folded-over end of the top layer;
    a fusion seam 12 is provided extending transversly of said 6 ends of said folded over top layer and said bottom layer, and fusing said abutting ends together; and
    the longitudinal edge seam 10 fusing together the lateral edges of said layers extends along is said band and across and beyond said fusion seam (12) bridging said fusion seam to secure said folded-over end of the top layer at both lateral edges as well as by said transverse fusion seam.

2. Watchband according to claim 1, wherein said transverse fusion seam 12, 13 penetrates only said top and bottom layers and is invisible from the top side of said top layer 7.

3. Watchband according to claim 1, including a reinforcing inner layer 8 folded over itself to form said loop 3, 4, 5 and extending beyond said transverse fusion seam 12, 13), said inner layer 8 being fused at its lateral edges with said top and bottom layers.

4. Watchband according to claim 3, wherein said reinforcing inner layer terminates intermediate the length of said band, the end of said inner layer tapering off gradually to prevent an abrupt change of thickness of said band.

5. Watchband according to claim 1, wherein said transverse fusion seam is formed with an embossed pattern 13.

6. Watchband according to claim 1 wherein the bottom layer comprises suede-type polyvinyl chloride material.